US012731815B2

(12) United States Patent
Goto

(10) Patent No.: US 12,731,815 B2
(45) **Date of Patent: *Sep. 8, 2026**

(54) ALL SOLID STATE BATTERY

(71) Applicant: TOYOTA JIDOSHA KABUSHIKI KAISHA, Toyota (JP)

(72) Inventor: Ippei Goto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

This patent is subject to a terminal disclaimer.

(21) Appl. No.: 18/588,405

(22) Filed: Feb. 27, 2024

(65) Prior Publication Data

US 2024/0204248 A1 Jun. 20, 2024

Related U.S. Application Data

(63) Continuation of application No. 17/945,522, filed on Sep. 15, 2022.

(30) Foreign Application Priority Data

Sep. 27, 2021 (JP) ................................ 2021-156529

(51) Int. Cl.
*H01M 10/0562* (2010.01)
*H01M 4/80* (2006.01)

(52) U.S. Cl.
CPC ....... *H01M 10/0562* (2013.01); *H01M 4/806* (2013.01)

(58) Field of Classification Search
CPC ............ H01M 10/0562; H01M 4/806; H01M 2300/0068; H01M 2300/0094; H01M 50/44; H01M 50/489
See application file for complete search history.

(56) References Cited

U.S. PATENT DOCUMENTS 5,055,242 A 10/1991 Vane
2013/0095367 A1 4/2013 Kim
(Continued)

FOREIGN PATENT DOCUMENTS

JP 2013-534704 A 9/2013
JP 2016-031789 A 3/2016
(Continued)

OTHER PUBLICATIONS

Muhammad Tausif, Achilles Pliakas, Tom O'Haire, Parikshit Goswami and Stephen J. Russell, "Mechanical Properties of Nonwoven Reinforced Thermoplastic Polyurethane Composites", Materials 2017, 10(6), 618; https://doi.org/10.3390/ma10060618. (Year: 2017).*
(Continued)

*Primary Examiner* — Dah-Wei D. Yuan
*Assistant Examiner* — Pin Jan Wang
(74) *Attorney, Agent, or Firm* — Oliff PLC

(57) ABSTRACT

An all solid state battery includes a cathode layer, an anode layer, and a solid electrolyte layer arranged between the cathode layer and the anode layer, wherein: the solid electrolyte layer includes a first solid electrolyte layer, and a second electrolyte layer arranged in the anode layer side compared to the first solid electrolyte layer; the first solid electrolyte layer contains a first nonwoven fabric, and a first solid electrolyte arranged inside the first nonwoven fabric; the second solid electrolyte layer contains a second nonwoven fabric, and a second solid electrolyte arranged inside the second nonwoven fabric; and in a plan view along a thickness direction, an angle formed by a first fabric direction in the first nonwoven fabric and a second fabric direction in the second nonwoven fabric is 45° or more and 90° or less.

9 Claims, 1 Drawing Sheet

(56) References Cited

U.S. PATENT DOCUMENTS

| | | | | |
|---|---|---|---|---|
| 2014/0377628 | A1* | 12/2014 | Nandi ................ | H01M 50/403 156/60 |
| 2015/0147659 | A1* | 5/2015 | Kato ................ | H01M 10/0562 29/623.5 |
| 2021/0381143 | A1 | 12/2021 | Kawano et al. | |
| 2022/0181703 | A1 | 6/2022 | Ishiguro et al. | |
| 2023/0170523 | A1 | 6/2023 | Katagiri et al. | |

FOREIGN PATENT DOCUMENTS

| | | | |
|---|---|---|---|
| JP | 2020-181758 | A | 11/2020 |
| JP | 2020188026 | A | * 11/2020 |
| KR | 10-2012-0003407 | A | 1/2012 |
| KR | 10-2015-0018559 | A | 2/2015 |
| KR | 10-2021-0047886 | A | 4/2021 |

OTHER PUBLICATIONS

Aug. 6, 2025 Office Action issued in U.S. Appl. No. 17/945,522.
Tausif et al., Mechanical Properties of Nonwoven Reinforced Thermoplastic Polyurethane Composites, Materials, 2017.
Apr. 18, 2025 Office Action issued in U.S. Appl. No. 17/945,522.
Jan. 12, 2026 Office Action issued in U.S. Appl. No. 17/945,522.

* cited by examiner

ALL SOLID STATE BATTERY

CROSS-REFERENCE TO RELATED APPLICATION

This is a Continuation of application Ser. No. 17/945,522, filed Sep. 15, 2022, which claims the benefit of Japanese Patent Application No. 2021-156529, filed Sep. 27, 2021. The disclosures of the prior applications are hereby incorporated by reference herein in their entirety.

TECHNICAL FIELD

The present disclosure relates to an all solid state battery.

BACKGROUND ART

An all solid state battery is a battery including a solid electrolyte layer between a cathode layer and an anode layer, and one of the advantages thereof is that the simplification of a safety device may be more easily achieved compared to a liquid-based battery including a liquid electrolyte containing a flammable organic solvent. Patent Literature 1 discloses a solid electrolyte sheet to be used for an all solid secondary battery, the solid electrolyte sheet comprising a nonwoven fabric, and a solid electrolyte on a surface of and inside the nonwoven fabric.

Patent Literature 2 discloses a method for producing a solid electrolyte film for an all solid state battery comprising a step of forming a nonwoven fabric including fiber formed of a resin. Also, Patent Literature 3 discloses an electrode assembly comprising a first electrode including a first structure body formed by a plurality of fibers extending to a first direction, a second electrode including a second structure body formed by a plurality of fibers extending to a second direction that is different from the first direction, and a separation film arranged between the first structure body and the second structure body.

CITATION LIST

Patent Literatures

Patent Literature 1: Japanese Patent Application Laid-Open (JP-A) No. 2016-031789
Patent Literature 2: JP-A No. 2020-181758
Patent Literature 3: Japanese Unexamined Patent Publication (JP-A) No. 2013-534704

SUMMARY OF DISCLOSURE

Technical Problem

From a viewpoint of improving performance of a battery, an all solid state battery with excellent cycle characteristics has been required. The present disclosure has been made in view of the above circumstances and a main object thereof is to provide an all solid state battery with excellent cycle characteristics.

Solution to Problem

The present disclosure provides an all solid state battery comprising a cathode layer, an anode layer, and a solid electrolyte layer arranged between the cathode layer and the anode layer, wherein: the solid electrolyte layer includes a first solid electrolyte layer, and a second electrolyte layer arranged in the anode layer side compared to the first solid electrolyte layer; the first solid electrolyte layer contains a first nonwoven fabric, and a first solid electrolyte arranged inside the first nonwoven fabric; the second solid electrolyte layer contains a second nonwoven fabric, and a second solid electrolyte arranged inside the second nonwoven fabric; and in a plan view along a thickness direction, an angle formed by a first fabric direction in the first nonwoven fabric and a second fabric direction in the second nonwoven fabric is 45° or more and 90° or less.

According to the present disclosure, the angle formed by the first fabric direction and the second fabric direction is in the specified range, and thus the all solid state battery with excellent cycle characteristics may be obtained.

In the disclosure, the angle may be 80° or more and 90° or less.

In the disclosure, each of a void rate in the first nonwoven fabric and a void rate in the second nonwoven fabric may be 70% or more and 90% or less.

In the disclosure, in the first nonwoven fabric, a tensile strength of the first fabric direction may be larger than a tensile strength of a direction orthogonal to the first fabric direction; and in the second nonwoven fabric, a tensile strength of the second fabric direction may be larger than a tensile strength of a direction orthogonal to the second fabric direction.

In the disclosure, at least one of the first solid electrolyte and the second solid electrolyte may be an inorganic solid electrolyte.

In the disclosure, the inorganic solid electrolyte may be at least one kind of a sulfide solid electrolyte, an oxide solid electrolyte, and a hydride solid electrolyte.

In the disclosure, at least one of the first solid electrolyte and the second solid electrolyte may be a molten salt, which is in a solid state at 25° C.

In the disclosure, at least one of the first solid electrolyte and the second solid electrolyte may be a plastic crystal solid electrolyte.

Advantageous Effects of Disclosure

The all solid state battery in the present disclosure exhibits an effect of excellent cycle characteristics.

DESCRIPTION OF EMBODIMENTS

The all solid state battery in the present disclosure is hereinafter explained in details with reference to drawings. Each drawing described as below is a schematic view, and the size and the shape are appropriately exaggerated in order to be understood easily. Further, in each drawing, hatchings or reference signs are appropriately omitted.

Figure 1:
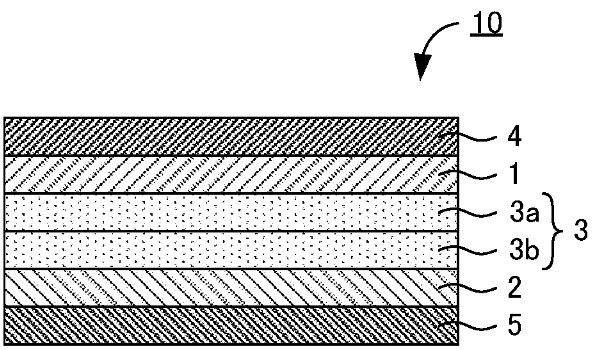
FIG. 1 is a schematic cross-sectional view exemplifying the all solid state battery in the present disclosure.

FIG. 1 is a schematic cross-sectional view exemplifying the all solid state battery in the present disclosure. All solid state battery 10 illustrated in FIG. 1 includes cathode layer 1, anode layer 2, solid electrolyte layer 3 arranged between the cathode layer 1 and the anode layer 2, cathode current collector 4 for collecting currents of the cathode layer 1, and anode current collector 5 for collecting currents of the anode layer 2. The solid electrolyte layer 3 includes first solid electrolyte layer 3*a*, and second electrolyte layer 3*b* arranged in the anode layer 2 side compared to the first solid electrolyte layer 3*a*. The first solid electrolyte layer 3*a* contains a first nonwoven fabric, and a first solid electrolyte arranged inside the first nonwoven fabric. Also, the second solid electrolyte layer 3*b* contains a second nonwoven fabric, and a second solid electrolyte arranged inside the second nonwoven fabric.

Figure 2:
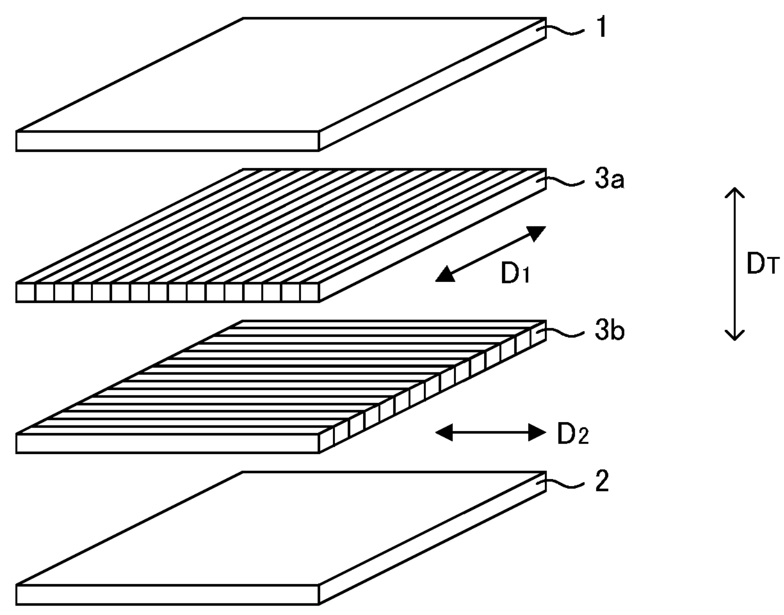
FIG. 2 is a schematic perspective view explaining the all solid state battery in the present disclosure.

FIG. 2 is a schematic perspective view explaining the all solid state battery in the present disclosure. Incidentally, in FIG. 2, for convenience, there are spaces between each layer. As shown in FIG. 2, $D_1$ designates a first fabric direction in a first nonwoven fabric included in the first solid electrolyte layer 3*a*. Similarly, $D_2$ designates a second fabric direction in a second nonwoven fabric included in the second solid electrolyte layer 3*b*. In a plan view along thickness direction $D_T$, the angle formed by the $D_1$ and the $D_2$ is in the specified range. For example, in FIG. 3, angle θ formed by the $D_1$ and the $D_2$ is 90°. In the present disclosure, the angle θ formed by the $D_1$ and the $D_2$ signifies an acute angle side, and is usually 90° or more.

According to the present disclosure, the angle formed by the first fabric direction and the second fabric direction is in the specified range, and thus the all solid state battery with excellent cycle characteristics may be obtained. As described in the above described Patent Literature 1, a solid electrolyte sheet (solid electrolyte layer) including a solid electrolyte inside a nonwoven fabric has been known. When the solid electrolyte layer includes a nonwoven fabric, for example, there is an advantage that the thickness of the solid electrolyte layer may be decreased while maintaining the insulation properties.

Meanwhile, when a plurality of fibers configuring the nonwoven fabric extend to one direction, the tensile strength thereof is not isotropic, but is anisotropic. Here, the direction to which the plurality of fibers mainly extend is defined as a fabric direction. The fabric direction usually matches Machine Direction (MD), which corresponds to a running direction (flow direction) in a production process of the nonwoven fabric. Also, in general, the direction orthogonal to the MD is referred to as Cross Direction (CD). The MD and the CD may be specified by observing the nonwoven fabric with a microscope, and confirming the direction to which the fabric extends. When the plurality of fibers configuring the nonwoven fabric extend to one direction, a tensile strength of the fabric direction (MD) is usually larger than a tensile strength of the direction (CD) orthogonal to the fabric direction.

In the nonwoven fabric, when the tensile strength of the MD and the tensile strength of the CD are different, uniformity of the solid electrolyte layer would be deteriorated every when stress along charge and discharge is applied to the solid electrolyte layer. As a result, internal short circuit such as slight short circuit easily occurs to degrade cycle characteristics. In contrast, in the present disclosure, the first solid electrolyte layer and the second solid electrolyte layer are arranged so that the first fabric direction in the first nonwoven fabric crosses the second fabric direction in the second nonwoven fabric. Thereby, the anisotropy of the tensile strength may be moderated. As a result, the uniformity of the solid electrolyte layer is maintained to improve cycle characteristics.

Figure 3:
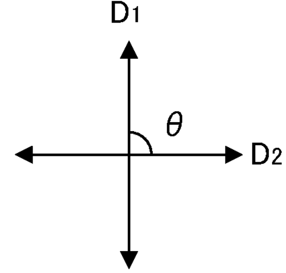
FIG. 3 is a diagram explaining the first fabric direction and the second fabric direction in the present disclosure.

As shown in FIG. 2, $D_1$ designates a first fabric direction in a first nonwoven fabric included in the first solid electrolyte layer 3*a*. Similarly, $D_2$ designates a second fabric direction in a second nonwoven fabric included in the second solid electrolyte layer 3*b*. Also, as shown in FIG. 3, θ designates the angle formed by the $D_1$ and the $D_2$. The angle θ is usually 45° or more, may be 60° or more, may be 70° or more, and may be 80° or more. Meanwhile, the angle θ may be 90°, and may be less than 90°.

1. Solid Electrolyte Layer

The solid electrolyte layer in the present disclosure is a layer arranged between the cathode layer and the anode layer. Also, the solid electrolyte layer includes a first solid electrolyte layer, and a second electrolyte layer arranged in the anode layer side compared to the first solid electrolyte layer.

(1) First Solid Electrolyte Layer

The first solid electrolyte layer contains a first nonwoven fabric, and a first solid electrolyte arranged inside the first nonwoven fabric.

(i) First Nonwoven Fabric

The first nonwoven fabric usually includes a plurality of fibers, and voids are formed among the plurality of fibers. Also, the plurality of fibers extends along the first fiber direction. The plurality of fibers may extend, linearly, meanderingly, or zigzaggingly, along the first fiber direction. Examples of the material for the fibers may include a resin such as a polyester-based resin, a polyolefin-based resin, and a polyamide-based resin. Examples of the polyester-based resin may include polyethylene terephthalate (PET). Examples of the polyolefin-based resin may include polyethylene (PE), and a polypropylene (PP). Examples of the polyamide-based resin may include nylon and aramid. Also, glass may be used as the material for the fibers. In other words, the first nonwoven fabric may be glass fabric nonwoven fabric. There are no particular limitations on the fiber diameter and the fiber length of the fibers configuring the first nonwoven fabric.

The void rate of the first nonwoven fabric is not particularly limited, and for example, it is 50% or more, may be 60% or more, and may be 70% or more. If the void rate of the first nonwoven fabric is too little, internal resistance would easily increase. Meanwhile, the void rate of the first nonwoven fabric is, for example, 95% or less and may be 90% or less. If the void rate of the first nonwoven fabric is too much, there is a possibility that it may not work as a supporting body. The void rate of the first nonwoven fabric may be obtained by, for example, observing the cross-section of the nonwoven fabric. Also, there are no particular limitations on the size of the void.

In the first nonwoven fabric, $TS_1$ designates the tensile strength of the first fabric direction (MD), and $TS_2$ designates the tensile strength of the direction (CD) orthogonal to the first fabric direction. The $TS_1$ is preferably larger than the $TS_2$. In this case, cycle characteristics tend to degrade due to the anisotropy of the tensile strength. In contrast, in the present disclosure, by setting the angle formed by the first fabric direction and the second fabric direction in the specified range, the anisotropy of the tensile strength is moderated. The $TS_1$ is, for example, 1 N/cm or more, may be 3 N/cm or more, and may be 5 N/cm or more. Meanwhile, $TS_1$ is, for example, 50 N/cm or less. Also, the $TS_2$ is, for example, 0.1 N/cm or more, may be 0.5 N/cm or more, and may be 1 N/cm or more. Meanwhile, the $TS_2$ is, for example, 30 N/cm or less. Also, the rate of the $TS_1$ with respect to the $TS_2$, which is $TS_1/TS_2$ is, for example, 1.1 or more, may be 1.5 or more, may be 2.0 or more, and may be 5.0 or more. Meanwhile, the $TS_1/TS_2$ is, for example, 50 or less.

Examples of the kind of the first nonwoven fabric may include a chemical bond nonwoven fabric, a thermal bond nonwoven fabric, an air laid nonwoven fabric, a spun lace nonwoven fabric, a spunbonded nonwoven fabric, a melt blown nonwoven fabric, a needle punched nonwoven fabric, and a stitch bond nonwoven fabric. Also, the thickness of the first nonwoven fabric is not particularly limited, and for example, it is 1 μm or more, may be 5 μm or more, and may be 10 μm or more. Meanwhile, the thickness of the first nonwoven fabric is, for example, 50 μm or less.

(ii) First Solid Electrolyte

The first solid electrolyte layer contains a first solid electrolyte arranged inside the first nonwoven fabric. The first solid electrolyte layer may contain just one kind of the first solid electrolyte, and may contain two kinds or more thereof. Examples of the first solid electrolyte may include an inorganic solid electrolyte such as a sulfide solid electrolyte, an oxide solid electrolyte, a hydride solid electrolyte, a halide solid electrolyte, and a nitride solid electrolyte. The sulfide solid electrolyte preferably contains sulfur (S) as a main component of the anion element. The oxide solid electrolyte preferably contains oxygen (O) as a main component of the anion element. The hydride solid electrolyte preferably contains hydrogen (H) as a main component of the anion element. The halide solid electrolyte preferably contains halogen (X) as a main component of the anion. The nitride solid electrolyte preferably contains nitrogen (N) as a main component of the anion element.

It is preferable that the sulfide solid electrolyte contains, for example, a Li element, an A element (A is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element.

The sulfide solid electrolyte preferably includes an anion structure of an ortho composition (such as $PS_4^{3-}$ structure, $SiS_4^{4-}$ structure, $GeS_4^{4-}$ structure, $AlS_3^{3-}$ structure, or $BS_3^{3-}$ structure) as the main component of the anion structure. The reason therefor is that chemical stability is high. The proportion of the anion structure of the ortho composition with respect to all the anion structures in the sulfide solid electrolyte is, for example, 70 mol % or more and may be 90 mol % or more.

The sulfide solid electrolyte may be amorphous, and may be crystalline. In the latter case, the sulfide solid electrolyte includes a crystal phase. Examples of the crystal phase may include a Thio-LISICON type crystal phase, a LGPS type crystal phase, and an argyrodite type crystal phase.

There are no particular limitations on the composition of the sulfide solid electrolyte, and examples thereof may include $xLi_2S\cdot(100-x)P_2S_5 (70 \le x \le 80)$, and $yLiI\cdot zLiBr\cdot(100-y-z)(xLi_2S\cdot(1-x)P_2S_5)(0.7 \le x \le 0.8,\ 0 \le y \le 30,\ 0 \le z \le 30)$.

The sulfide solid electrolyte may have a composition represented by a general formula (1): $Li_{4-x}Ge_{1-x}P_xS_4$ $(0<x<1)$. In the general formula (1), at least a part of Ge may be substituted with at least one of Sb, Si, Sn, B, Al, Ga, In, Ti, Zr, V and Nb. In the general formula (1), at least a part of P may be substituted with at least one of Sb, Si, Sn, B, Al, Ga, In, Ti, Zr, V and Nb. In the general formula (1), a part of Li may be substituted with at least one of Na, K, Mg, Ca and Zn. In the general formula (1), a part of S may be substituted with halogen (at least one of F, Cl, Br and I).

Additional examples of the composition of the sulfide solid electrolyte may include $Li_{7-x-2y}PS_{6-x-y}X_y$, $Li_{8-x-2y}SiS_{6-x-y}X_y$, and $Li_{8-x-2y}GeS_{6-x-y}X_y$. In these compositions, X is at least one kind of F, Cl, Br and I, and x and y satisfy $0 \le x$, $0 \le y$.

Examples of the oxide solid electrolyte may include a solid electrolyte containing a Li element, a Y element (Y is at least one kind of Nb, B, Al, Si, P, Ti, Zr, Mo, W, and S), and an O element. Specific examples of the oxide solid electrolyte may include a garnet type solid electrolyte such as $Li_7La_3Zr_2O_{12}$, $Li_{7-x}La_3(Zr_{2-x}Nb_x)O_{12}$ $(0 \le x \le 2)$, and $Li_5La_3Nb_2O_{12}$; a Perovskite type solid electrolyte such as $(Li,La)TiO_3$, $(Li,La)NbO_3$, and $(Li,Sr)(Ta,Zr)O_3$; a nasicon type solid electrolyte such as $Li(Al,Ti)(PO_4)_3$, and $Li(Al,Ga)(PO_4)_3$; a Li—P—O-based solid electrolyte such as $Li_3PO_4$, and LIPON (a compound formed by substituting a part of O in $Li_3PO_4$ with N); and a Li—B—O-based solid electrolyte such as $Li_3BO_3$, and a compound formed by substituting a part of O in $Li_3BO_3$ with C.

The hydride solid electrolyte includes, for example, Li, and a complex anion containing hydrogen. Examples of the complex anon may include $(BH_4)^-$, $(NH_2)^-$, $(AlH_4)^-$, and $(AlH_6)^{3-}$. Examples of the halide solid electrolyte may include $Li_{6-3z}Y_zX_6$ (X is at least one kind of Cl and Br, and z satisfies $0<z<2$). Examples of the nitride solid electrolyte may include $Li_3N$.

Additional examples of the first solid electrolyte may include a molten salt, which is in a solid state at 25° C. The molten salt includes a cation and an anion. Examples of the cation may include an inorganic cation such as a lithium ion; and an organic cation such as an ammonium-based cation, a piperidinium-based cation, a pyrrolidinium-based cation, an imidazolium-based cation, a pyridium-based cation, an alicyclic amine-based cation, an aliphatic amine-based cation, and an aliphatic phosphonium-based cation. Examples of the anion may include an anion having a sulfonyl amide structure. Examples of the anion having the sulfonyl amide structure may include bis(trifluoromethanesulfonyl)amide, bis(fluorosulfonyl)amide, bis(pentafluoroethanesulfonyl)amide, and (fluorosulfonyl)(trifluoromethanesulfonyl)amide. The melting point of the molten salt is, usually 25° C. or more, may be 30° C. or more, and may be 40° C. or more. Meanwhile, the melting point of the molten salt is, for example, 200° C. or less, may be 150° C. or less, and may be 120° C. or less.

Additional examples of the first solid electrolyte may include a plastic crystal solid electrolyte. The plastic crystal refers to a material configured by a regularly organized three-dimensional crystal lattice, wherein orientational and rotational disorder is present in the level of molecular species or molecular ions. The plastic crystal includes a cation and an anion. Examples of the cation may include pyrrolidinium, tetraalkyl ammonium and tetraalkyl phosphonium. Examples of the anion may include hexafluorophosphate, tetrafluoroborate, thiocyanate, bis(trifluoromethanesulfonyl)amide, bis(fluorosulfonyl)amide, bis(pentafluoroethanesulfonyl)amide, and (fluorosulfonyl)(trifluoromethanesulfonyl)amide.

Examples of the shape of the first solid electrolyte may include a granular shape. The average particle size ($D_{50}$) of the first solid electrolyte is not particularly limited, and for example, it is 10 nm or more, and may be 100 nm or more. Meanwhile, the average particle size ($D_{50}$) of the first solid electrolyte is, for example, 50 μm or less, and may be 20 μm or less. The average particle size ($D_{50}$) of the first solid electrolyte is preferably smaller than the thickness of the first nonwoven fabric. The average particle size ($D_{50}$) may be calculated from, for example, a measurement with a laser diffraction particle distribution meter or a scanning electron microscope (SEM). The proportion of the total volume of the first solid electrolyte with respect to the total volume of the void in the first nonwoven fabric is, for example, 50 volume % or more, may be 70 volume % or more, and may be 90 volume % or more.

(iii) First Solid Electrolyte Layer

The first solid electrolyte layer may or may not contain a binder. Examples of the binder may include a rubber-based binder such as a butadiene rubber, a butadiene hydride rubber, a styrene butadiene rubber (SBR), a styrene butadiene hydride rubber, a nitrile butadiene rubber, a nitrile butadiene hydride rubber, and an ethylene propylene rubber; and a fluoride-based binder such as polyvinylidene fluoride (PVDF), a polyvinylidene fluoride-polyhexafluoropropylene copolymer (PVDF-HFP), polytetra fluoroethylene, and a fluorine rubber. The proportion of the binder in the first solid electrolyte layer with respect to the 100 parts by weight of the first solid electrolyte is, for example, 0 part by weight or more and 3 parts by weight or less.

There are no particular limitations on the shape of the first solid electrolyte in a plan view, and examples thereof may include a square shape such as a foursquare shape and a rectangular shape. The Young's modulus of the first solid electrolyte layer is, for example, 1 GPa or more. The thickness of the first solid electrolyte layer is not particularly limited, and for example, it is 1 μm or more, may be 5 μm or more, and may be 10 μm or more. Meanwhile, the thickness of the first solid electrolyte layer is, for example, 50 μm or less.

(2) Second Solid Electrolyte Layer

The second solid electrolyte layer contains a second nonwoven fabric, and a second solid electrolyte arranged inside the second nonwoven fabric. Details of the second nonwoven fabric and the second solid electrolyte are respectively in the same contents as those of the first nonwoven fabric and the first solid electrolyte; thus the descriptions herein are omitted. The second solid electrolyte and the first solid electrolyte are, for example, preferably a sulfide solid electrolyte. Also, the preferable embodiments of the second solid electrolyte layer are the same as the preferable embodiments of the first solid electrolyte layer described above.

(3) Solid Electrolyte Layer

The solid electrolyte layer in the present disclosure includes the first solid electrolyte layer and the second solid electrolyte layer. The first nonwoven fabric in the first solid electrolyte layer may directly contact the second nonwoven fabric in the second solid electrolyte layer. The both directly contact with each other, and thus, for example, the anisotropy of the tensile strength may be further moderated. Meanwhile, an intermedium solid electrolyte layer may be arranged between the first nonwoven fabric and the second nonwoven fabric. Arrangement of the intermedium solid electrolyte layer may reduce internal resistance. The intermedium solid electrolyte layer contains at least a solid electrolyte, and may contain a binder as required. The solid electrolyte and the binder are in the same contents as those described in "(1) First solid electrolyte layer" above. The intermedium solid electrolyte layer is usually a layer not containing a nonwoven fabric. There are no particular limitations on the thickness of the intermedium solid electrolyte layer, and for example, it is smaller than the thickness of the first nonwoven fabric and the thickness of the second nonwoven fabric.

The first nonwoven fabric in the first solid electrolyte layer may directly contact the cathode layer. Meanwhile, a cathode side solid electrolyte layer may be arranged between the first nonwoven fabric and the cathode layer. Arrangement of the cathode side solid electrolyte layer may reduce internal resistance. The cathode side solid electrolyte layer contains at least a solid electrolyte, and may contain a binder as required. The solid electrolyte and the binder are in the same contents as those described in "(1) First solid electrolyte layer" above. The cathode side solid electrolyte layer usually does not have electron conductivity. Also, the cathode side solid electrolyte layer usually does not contain a nonwoven fabric. There are no particular limitations on the thickness of the cathode side solid electrolyte layer, and for example, it is smaller than the thickness of the first solid electrolyte layer.

The second nonwoven fabric in the second solid electrolyte layer may directly contact the anode layer. Meanwhile, an anode side solid electrolyte layer may be arranged between the second nonwoven fabric and the anode layer. Arrangement of the anode side solid electrolyte layer may reduce internal resistance. The anode side solid electrolyte layer contains at least a solid electrolyte, and may contain a binder as required. The solid electrolyte and the binder are in the same contents as those described in "(1) First solid electrolyte layer" above. The anode side solid electrolyte layer usually does not have electron conductivity. Also, the anode side solid electrolyte layer usually does not contain a nonwoven fabric. There are no particular limitations on the thickness of the anode side solid electrolyte layer, and for example, it is smaller than the thickness of the second solid electrolyte layer.

The solid electrolyte layer in the present disclosure may include just the first solid electrolyte layer and the second solid electrolyte layer as the layers containing a nonwoven fabric, and may further contain one or two or more of an additional layer (nonwoven fabric-containing layer). The angle formed by a fabric direction in the nonwoven fabric of the additional layer and the first fabric direction is, for example, 30° or more. Also, the angle formed by a fabric direction in the nonwoven fabric of the additional layer and the second fabric direction is, for example, 30° or more.

The thickness of the solid electrolyte layer is, for example, 1 μm or more, may be 5 μm or more, and may be 10 μm or more. Meanwhile, the thickness of the solid electrolyte layer is, for example, 150 μm or less, and may be 100 μm or less.

2. Cathode Layer

The cathode layer is a layer containing at least a cathode active material, and may contain at least one of a solid electrolyte, a conductive material and a binder, as required. Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}CO_{1/3}Mn_{1/3}O_2$; a spinel type active material such as $LiMn_2O_4$, $Li_4Ti_5O_{12}$ and $Li(Ni_{0.5}Mn_{1.5})O_4$; and an olivine type active material such as $LiFePO_4$, $LiMnPO_4$, $LiNiPO_4$, and $LiCoPO_4$.

A protective layer containing Li-ion conductive oxide may be formed on the surface of the oxide active material. The reason therefor is to inhibit the reaction of the oxide active material and the solid electrolyte. Examples of the Li-ion conductive oxide may include $LiNbO_3$. The thickness of the protective layer is, for example, 1 nm or more and 30 nm or less. Also, as the cathode active material, for example, $Li_2S$ can be used.

Examples of the shape of the cathode active material may include a granular shape. The average particle size ($D_{50}$) of the cathode active material is not particularly limited, and for example, it is 10 nm or more, and may be 100 nm or more. Meanwhile, the average particle size ($D_{50}$) of the cathode active material is, for example, 50 μm or less, and may be 20 μm or less.

The cathode layer may contain a conductive material. Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF). Also, the solid electrolyte and the binder to be used in the cathode layer are in the same contents as those described in "1. Solid electrolyte layer" above; thus, the descriptions herein are omitted. The thickness of the cathode layer is, for example, 0.1 μm or more and 1000 μm or less.

3. Anode Layer

The anode layer is a layer containing at least an anode active material, and may contain at least one of a solid electrolyte, a conductive material and a binder, as required. Examples of the anode active material may include a Li-based active material such as a metal lithium and a lithium alloy; a carbon-based active material such as graphite, hard carbon and soft carbon; an oxide-based active material such as lithium titanate; and a Si-based active material such as a simple substance of Si, a Si alloy and a silicon oxide.

Examples of the shape of the anode active material may include a granular shape. The average particle size ($D_{50}$) of the anode active material is, for example, 10 nm or more, and may be 100 nm or more. Meanwhile, the average particle size ($D_{50}$) of the anode active material is, for example, 50 μm or less, and may be 20 μm or less.

The conductive material, the solid electrolyte and the binder to be used in the anode layer are in the same contents as those described in "1. Solid electrolyte layer" and "2. Cathode layer" above; thus, the descriptions herein are omitted. The thickness of the anode layer is, for example, 0.1 μm or more and 1000 μm or less.

4. All Solid State Battery

The all solid state battery in the present disclosure comprises a cathode layer, a solid electrolyte layer and an anode layer. Here, when a set of the cathode layer, the solid electrolyte layer and the anode layer is regarded as a power generating unit, the all solid state battery may include just one of the power generating unit, and may include two or more thereof. When the all solid state battery comprises two or more of the power generating unit, they may be connected in series and may be connected in parallel.

The all solid state battery may include a cathode current collector for collecting currents of the cathode layer. The cathode current collector is typically arranged in the position opposite to the solid electrolyte layer on the basis of the cathode layer. Examples of the material for the cathode current collector may include stainless steel, aluminum, nickel, iron, titanium and carbon. Also, examples of the shape of the cathode current collector may include a foil shape and a mesh shape.

The all solid state battery may include an anode current collector for collecting currents of the anode layer. The anode current collector is typically arranged in the position opposite to the solid electrolyte layer on the basis of the anode layer. Examples of the material for the anode current collector may include stainless steel, copper, nickel, and carbon. Also, examples of the shape of the anode current collector may include a foil shape and a mesh shape.

The all solid state battery may include an outer package for storing at least the above described power generating element. Examples of the outer package may include a laminate type outer package and a case type outer package.

The all solid state battery may include a restraining part that applies a restraining pressure to a thickness direction of the cathode layer, the solid electrolyte layer, and the anode layer. The restraining pressure is, for example, 0.1 MPa or more, may be 1 MPa or more, and may be 5 MPa or more. Meanwhile, the restraining pressure is, for example, 100 MPa or less, may be 50 MPa or less, and may be 20 MPa or less.

The all solid state battery in the present disclosure is typically an all solid lithium ion secondary battery. The application of the all solid state battery is not particularly limited, and examples thereof may include a power source for vehicles such as hybrid electric vehicles (HEV), plug-in hybrid electric vehicles (PHEV), battery electric vehicles (BEV), gasoline-fueled automobiles and diesel powered automobiles. In particular, it is preferably used as a power source for driving hybrid electric vehicles, plug-in hybrid electric vehicles, or battery electric vehicles. Also, the all solid state battery in the present disclosure may be used as a power source for moving bodies other than vehicles (such as rail road transportation, vessel and airplane), and may be used as a power source for electronic products such as information processing equipment.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Production of Cathode>

As a cathode active material, $LiNi_{1/3}Co_{1/3}Mn_{1/3}O_2$ powder having an average particle size ($D_{50}$) measured based on a laser diffraction scattering method being 5 μm was used. Next, the surface of the cathode active material was coated with $LiNbO_3$ by a sol gel method. Also, as a sulfide solid electrolyte, $15LiBr \cdot 10LiI \cdot 75\ (0.75Li_2S \cdot 0.25P_2S_5)$ glass ceramic having an average particle size ($D_{50}$) measured based on a laser diffraction scattering method being 2.5 μm was used.

After that, the cathode active material and the sulfide solid electrolyte were weighted so as to be the cathode active material: the sulfide solid electrolyte=75:25 in the weight ratio, and then they were mixed to obtain a first mixture. Next, with respect to 100 parts by weight of the cathode active material, weighed were 3 parts by weight of a SBR (styrene butadiene rubber) based binder and 10 parts by weight of a conductive material (carbon nano fiber, CNF) so as to be added to the first mixture to obtain a second mixture. Next, a dispersion medium (butyl butyrate) was added to the second mixture, the solid concentration was adjusted to 60 weight %, and subjected to an ultrasonic dispersion treatment for 1 minute to obtain cathode slurry.

The obtained cathode slurry was uniformly pasted on a cathode current collector (an aluminum foil having a thickness of 15 μm) in a weight amount of 15 mg/cm$^2$ by blade coating, and the product was dried at 100° C. for 60 minutes. Thereby, a cathode (cathode structure body) including a cathode current collector and a cathode layer was obtained.

<Production of Anode>

As an anode active material, Si powder having an average particle size ($D_{50}$) measured based on a laser diffraction scattering method being 5 μm was used. Also, as a sulfide solid electrolyte, 15LiBr·10LiI·75 ($0.75Li_2S\cdot0.25P_2S_5$) glass ceramic having an average particle size ($D_{50}$) measured based on a laser diffraction scattering method being 2.5 μm was used.

After that, the anode active material and the sulfide solid electrolyte were weighed so as to be the anode active material:the sulfide solid electrolyte=50:50 in the weight ratio, and they were mixed to obtain a third mixture. Next, with respect to 100 parts by weight of the anode active material, weighed were 3 parts by weight of the SBR-based binder and 10 parts by weight of a conductive material (CNF), so as to be added to the third mixture to obtain a fourth mixture. Next, a dispersion medium (butyl butyrate) was added to the fourth mixture, the solid concentration was adjusted to 40 weight %, and subjected to an ultrasonic dispersion treatment for 1 minute to obtain anode slurry.

The obtained anode slurry was uniformly pasted on an anode current collector (roughen copper foil having a thickness of 25 μm, $R_z$=5 μm) in a weight amount of 3 mg/cm$^2$ by blade coating, and the product was dried at 100° C. for 60 minutes. Thereby, an anode (anode structure body) including an anode current collector and an anode layer was obtained.

<Production of Solid Electrolyte Layer>

As a sulfide solid electrolyte, 15LiBr·10LiI·75 ($0.75Li_2S\cdot0.25P_2S_5$) glass ceramic having an average particle size ($D_{50}$) measured based on a laser diffraction scattering method being 2.5 μm was used. Also, as a binder, a SBR-based binder was used.

After that, the sulfide solid electrolyte and the binder are weighed so as to be the sulfide solid electrolyte:the binder=99:1 in the weight ratio, and they were mixed to obtain a fifth mixture. Next, a dispersion medium (butyl butyrate) was added to the fifth mixture, the solid concentration was adjusted to 50 weight %, and subjected to an ultrasonic dispersion treatment for 1 minute to obtain slurry for a solid electrolyte layer.

After that, on an aluminum foil, a nonwoven fabric made of polyester (thickness: 15 μm, void rate: 80%, tensile strength of MD: 5 N/cm, tensile strength of CD: 1 N/cm) was arranged. Next, the obtained slurry was uniformly pasted on the nonwoven fabric made of polyester in a weight amount of 2.9 mg/cm$^2$ (thickness including the nonwoven fabric: 15 μm) by blade coating, and the product was dried at 100° C. for 60 minutes. Thereby, a transfer part including the aluminum foil and the solid electrolyte layer was obtained. Also, same operations were conducted to produce the same transfer part.

<Production of all Solid State Battery>

Two transfer parts were respectively cut out into the size of 6.2 cm by 6.2 cm in a foursquare shape. On this occasion, one transfer part was cut out so that the fiber direction (MD) thereof became parallel to one side of the foursquare (transfer part A). The other transfer part was cut out so that the fiber direction (MD) thereof crossed one side of the foursquare at 45° (transfer part B). Also, the anode structure body was cut out into the size of 6.2 cm by 6.2 cm in a foursquare shape. Also, the cathode structure body was cut out into the size of 6.0 cm by 6.0 cm in a foursquare shape.

After that, the anode layer in the anode structure body and the solid electrolyte layer in the transfer part A were overlapped, roll-pressed at the pressing pressure of 1 ton/cm$^2$, and then the aluminum foil was peeled off from the transfer part A. Next, the exposed solid electrolyte layer and the solid electrolyte layer in the transfer part B were overlapped, roll-pressed at the pressing pressure of 1 ton/cm$^2$, and then the aluminum foil was peeled off from the transfer part B. Thereby, a structure body X including the anode current collector, the anode layer, a second solid electrolyte layer and a first solid electrolyte layer, was obtained. Next, the first solid electrolyte layer in the structure body X and the cathode layer in the cathode structure body were overlapped, and roll-pressed at the pressing pressure of 3 ton/cm$^2$. Thereby, a structure body Y including the anode current collector, the anode layer, the second solid electrolyte layer, the first solid electrolyte layer, the cathode layer and the cathode current collector, was obtained. Next, the structure body Y was sealed by an outer package (laminate film made of aluminum) in which a cathode terminal and an anode terminal were attached in advance, and thereby an all solid state battery was obtained.

Example 2

An all solid state battery was obtained in the same manner as in Example 1, except that two of the transfer part A were used, and the first solid electrolyte layer and the second solid electrolyte layer were arranged so that the angle formed by the fiber direction (MD) in the first solid electrolyte layer and the fiber direction (MD) in the second solid electrolyte layer became 90°.

Comparative Example 1

Slurry for a solid electrolyte layer was obtained in the same manner as in Example 1. Next, a nonwoven fabric made of polyester (having a thickness of 30 μm) was arranged on an aluminum foil. Next, the obtained slurry was uniformly pasted on the nonwoven fabric made of polyester in a weight amount of 5.8 mg/cm$^2$ (thickness including the nonwoven fabric: 30 μm) by blade coating, and the product was dried at 100° C. for 60 minutes. Thereby, a transfer part including the aluminum foil and the solid electrolyte layer was obtained.

An all solid state battery was obtained in the same manner as in Example 1, except that the obtained transfer part was used, and each roll-pressing was conducted so that the fiber direction (MD) in the solid electrolyte layer became parallel to the running direction of the roll-pressing.

Comparative Example 2

An all solid state battery was obtained in the same manner as in Comparative Example 1, except that each roll-pressing was conducted so that the fiber direction (MD) in the solid electrolyte layer became orthogonal to the running direction of the roll-pressing.

Evaluation

A cycle test was conducted using all solid state batteries produced in Examples 1, 2 and Comparative Examples 1, 2. The measurement was conducted in the following procedures. First, the all solid state battery was respectively restrained at the pressure of 100 MPa, and CCCV-charged at the current rate of 36 mA until 4.5 V (current cut value: 0.36 mA). Next, the battery was respectively CCCV-discharged at the current rate of 36 mA until 3.0 V (current cut value:

0.36 mA). The charge and discharge were performed for 100 cycles to obtain capacity durability. The results are shown in Table 1.

Capacity durability (%)=(Discharge capacity of 100th cycle/discharge capacity of 1st cycle) *100

TABLE 1

| | Thickness of solid electro-lyte layer | Arrangement of nonwoven fabric | Capacity durability (%) |
|---|---|---|---|
| Example 1 | 15 μm*2 layers | Layered so that MD crossed at 45° | 57.1 |
| Example 2 | 15 μm*2 layers | Layered so that MD crossed at 90° | 60.2 |
| Comp. Ex. 1 | 30 μm*1 layer | MD: parallel to running direction of roll-pressing | 53.9 |
| Comp. Ex. 2 | 30 μm*1 layer | MD: orthogonal to running direction of roll-pressing | 52.3 |

As shown in Table 1, the capacity durability of Examples 1 and 2 was respectively higher than that of Comparative Examples 1 and 2. The reason therefor is presumably because the anisotropy of the tensile strength was moderated by setting the angle formed by the fabric direction (MD) in the first nonwoven fabric and the fabric direction (MD) in the second nonwoven fabric to be 45° or more and 90° or less.

REFERENCE SIGNS LIST

1 cathode layer
2 anode layer
3 solid electrolyte layer
3*a* first solid electrolyte layer
3*b* second solid electrolyte layer
4 cathode current collector
5 anode current collector
10 all solid state battery

What is claimed is:

1. A vehicle comprising an all solid state battery, wherein the all solid state battery comprises a cathode layer, an anode layer, and a solid electrolyte layer arranged between the cathode layer and the anode layer, wherein:

the solid electrolyte layer includes a first solid electrolyte layer, and a second electrolyte layer arranged in the anode layer side compared to the first solid electrolyte layer;

the first solid electrolyte layer contains a first nonwoven fabric having a sheet shape, and a first solid electrolyte arranged inside the first nonwoven fabric;

the second solid electrolyte layer contains a second non-woven fabric having a sheet shape, and a second solid electrolyte arranged inside the second nonwoven fabric;

the first nonwoven fabric and the second nonwoven fabric are different members; and in a plan view along a thickness direction, an angle formed by a first fabric direction in the first nonwoven fabric and a second fabric direction in the second nonwoven fabric is 45° or more and 90° or less.

2. The vehicle according to claim 1, wherein the angle is 80° or more and 90° or less.

3. The vehicle according to claim 1, wherein each of a void rate in the first nonwoven fabric and a void rate in the second nonwoven fabric is 70% or more and 90% or less.

4. The vehicle according to claim 1, wherein:

in the first nonwoven fabric, a tensile strength of the first fabric direction is larger than a tensile strength of a direction orthogonal to the first fabric direction; and in the second nonwoven fabric, a tensile strength of the second fabric direction is larger than a tensile strength of a direction orthogonal to the second fabric direction.

5. The vehicle according to claim 1, wherein at least one of the first solid electrolyte and the second solid electrolyte is an inorganic solid electrolyte.

6. The vehicle according to claim 5, wherein the inorganic solid electrolyte is at least one kind of a sulfide solid electrolyte, an oxide solid electrolyte, and a hydride solid electrolyte.

7. The vehicle according to claim 1, wherein the first nonwoven fabric and the second nonwoven fabric have a same fiber configuration.

8. The vehicle according to claim 7, wherein the first nonwoven fabric and the second nonwoven fabric are made of a same fiber material.

9. The vehicle according to claim 1, wherein the sheet shape is square or rectangular.

* * * * *